July 18, 1950  F. E. MARSH ET AL  2,516,011
INDICATOR
Filed May 14, 1949
Fig. I.
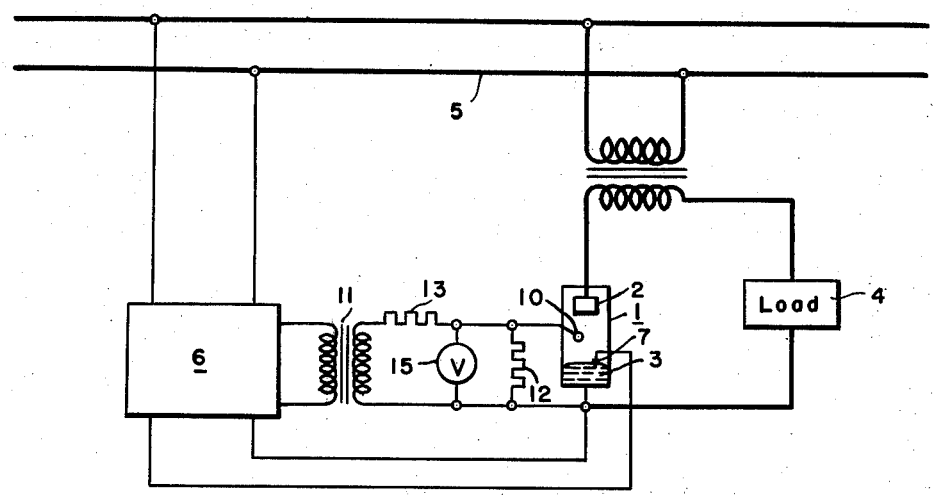
Fig. 2.
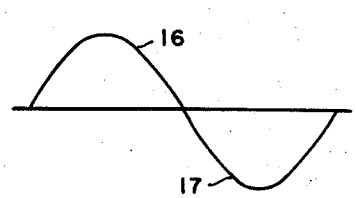
Fig. 3.
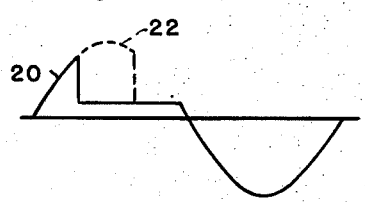
Fig. 4.
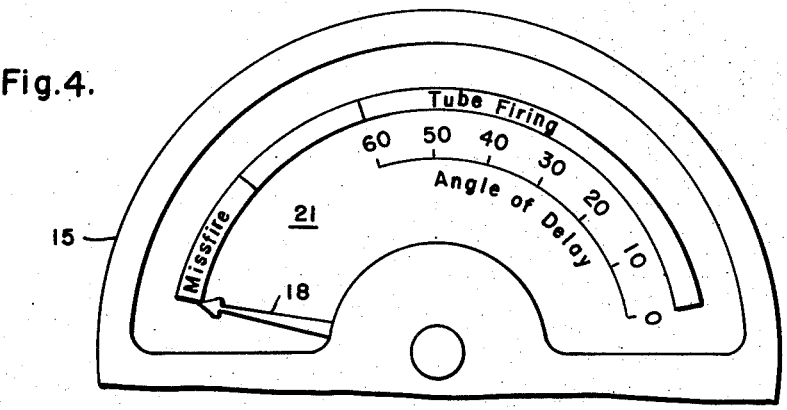
WITNESSES:
E. A. McCloskey
Nw. C. Groome
INVENTORS
Charles R. Marcum and
Francis E. Marsh.
BY
S. A. Strickler
ATTORNEY Patented July 18, 1950

2,516,011

UNITED STATES PATENT OFFICE 2,516,011

INDICATOR

Francis E. Marsh, Lockport, N. Y., and Charles R. Marcum, Pittsburgh, Pa., assignors to Westinghouse Electric Corporation, East Pittsburgh, Pa., a corporation of Pennsylvania Application May 14, 1949, Serial No. 93,288

5 Claims. (Cl. 315—364)

1

Our invention relates to a vapor electric device and particularly to means for ascertaining the operating condition inside of a vapor electric device.

In the operation of a vapor electric valve of the make-alive type, it is customary to provide periodic excitation or make-alive impulses to periodically initiate cathode spots to produce periodic conductive portions of cycles in the device. It frequently happens that the initiation of the cathode spot or the application of the initiating impulses fails to activate the cathode, and a so-called misfire results. Also, it can happen that the impulsing devices are out of phase or for some other reason delay the impulse so that the tube operates later than it is desirable to operate, in other words, operates with a positive angle of delay. At other times, tubes are intentionally operated at some desired angle of delay to control the voltage or other load characteristics.

It is desirable for the operator of such tubes to be able to ascertain the conditions within a tube, particularly in the event of sustained misfires.

According to our invention, we ascertain this condition in a simple manner by utilizing a voltage responsive device, as a direct current voltmeter to indicate the unbalance between the alternate half cycles of an alternating current potential applied to an auxiliary electrode, such as an auxiliary anode or the anode shield of a vapor electric device, to ascertain either a misfire or an angle of delay, as the tube does fire. This is possible because the application of the alternating current potential to the auxiliary electrode provides unbalanced potentials because of the unidirectional conducting characteristic of the device. By placing an impedance in series with the auxiliary electrode, the voltage drop across the impedance will be greater when the auxiliary electrode carries current than when no current is carried. Consequently, if the tube should misfire and the auxiliary electrode carries no current, the positive and negative half cycles will be of the same potential magnitude and have no effect on the direct current voltmeter which would thereby register zero or indicate a misfire. On the other hand, if the tube should fire, the drop in potential across the impedance will reduce the potential of that half wave compared to the succeeding half wave when no current flows, and the difference in magnitude of the succeeding half wave is a unidirectional potential which will be registered by the voltmeter.

2

If there is zero angle of delay in the tube, the maximum possible difference in potential will occur and give the maximum or full scale deflection to the voltmeter. However, if there is a delay angle between the maximum possible and the actual firing time, the apparent voltage will be somewhat between no voltage and the maximum possible voltage, resulting in a deflection indicating the angle of delay.

It is accordingly an object of our invention to provide a supervising circuit to indicate the operating conditions in a vapor electric device.

It is a further object of our invention to provide a direct current voltage responsive means to indicate the conditions in a vapor electric device.

Other objects and advantages of our invention will be apparent from the following detailed description taken in conjunction with the accompanying drawing, in which:

Figure 1 is a diagrammatic illustration of a vapor electric valve embodying our invention;

Fig. 2 is a graphic illustration of the alternating current full wave which occurs when a misfire occurs in the device;

Fig. 3 is an illustration of the unbalanced half waves of potential which occur when firing occurs in the device; and Fig. 4 is an illustration of a voltmeter indicating device according to our invention.

In the exemplary embodiment of our invention, a vapor electric valve 1 having a main anode 2 and a vaporizable reconstructing cathode 3 is connected to supply unidirectional potential to a load 4 from an alternating current circuit 5. A suitable impulsing apparatus 6 is utilized to apply periodic impulses to a make-alive or ignitron electrode 7 in contact with the vaporizable cathode 3. An auxiliary electrode, which may be either an auxiliary anode 10 placed in the tube 1 or some electrode already in the tube, such as the anode shield, is spaced from the cathode 3 and has applied thereto a periodic potential from a suitable alternating current source 11 so phased that the auxiliary electrode 10 is positive at the time the impulse is applied to the ignitor 7. If the impulse properly activates the ignitor 7 and creates a cathode spot, an arc should pick up to the auxiliary electrode 10 and maintain the cathode spot until such time as the arc should strike between the main anode 2 and the cathode 3.

Usually, an impedance, preferably a resistance 12, is connected between the auxiliary electrode 10 and the cathode 3 to stabilize the potential appearing on the auxiliary electrode 10. Usually, an impedance, preferably in the form of a resistor 13, is applied in series circuit relation between the source 11 of potential and the auxiliary electrode 10. We utilize this impedance 13, or rather the drop across the impedance 13, to determine the operating conditions in the tube itself, by placing an ordinary direct current voltmeter 15 across the alternating current circuit so that the drop across the impedance 13 produced by current flow to the auxiliary electrode 10 counterbalances the potential applied by the source to secure a potential proportional to the time of firing in the vapor electric device 1. If no firing occurs or a so-called misfire, then there will be no drop across the impedance 13, and the positive 16 and negative 17 half cycles will be equal, as shown in Fig. 2, and will cancel each other out so that there will be no effective voltage applied to the direct current voltmeter 15. Consequently, the pointer 18 of the direct current voltmeter 15 will remain in the zero or misfire indicating position. However, if the vapor electric device 1 should operate with zero angle of delay, the positive half cycle of the alternating current potential will be reduced, as shown in the solid lines 20 of Fig. 3, and the maximum D. C. potential will be applied to the D. C. voltmeter 15. Consequently, the maximum angle of displacement will be shown by the pointer 18, which will be calibrated as zero delay angle. Obviously, as the angle of delay is increased, the D. C. potential applied to the voltmeter 15 will be decreased, and the pointer 18 will move through less angle of rotation. By calibrating the dial 21 of the voltmeter 15 from misfire to zero angle of delay, it is possible to indicate or to ascertain from the indication the exact momentary condition within the vapor electric device 1. For example, with a 30° angle of delay, a potential, as indicated by the dotted line 22 of Fig. 3, will provide a relatively small comparison potential so that a 30° delay will be shown on the face 21 of the meter 15.

For purposes of illustration, we have shown a preferred embodiment of our invention and described the same to the best of our present ability. However, we wish it to be understood that this is illustrative only and that changes and modifications can be made therein without departing from the true spirit of our invention and the scope of the appended claims.

We claim as our invention:

1. A supervising system for a periodically excited electric discharge device having a main anode and cathode, an ignitor for periodically initiating a cathode spot in said device, an auxiliary electrode, an alternating current supply for said auxiliary electrode, circuit means including a resistor connecting said source to said auxiliary electrode and a direct current voltage responsive means connected across said source and said resistor.

2. In a vapor electric device having a main anode, a cathode and an ignitor electrode, a supervisory system comprising an auxiliary electrode in said device, an alternating current supply connected to said auxiliary electrode, an impedance connected in series circuit relation between said source and said auxiliary electrode and means responsive to the voltage drop across said impedance.

3. An electric discharge device having a main anode, a cathode and a control electrode, means for periodically energizing said control electrode, an auxiliary electrode, a source of alternating current potential, circuit means impressing said alternating potential on said auxiliary electrode, an impedance connected in said circuit means in series circuit relation between said source and said auxiliary electrode and a voltmeter registering the unbalance between the negative and positive half cycles of potential.

4. A condition indicator for a periodically excited vapor electric device having a main anode and cathode comprising an electrode in said device, a source of alternating potential, circuit means including an impedance connected in series circuit relation with said source and said electrode impressing the potential of said source between said electrode and the cathode of said valve and a direct current voltmeter connected across said circuit means.

5. A condition indicator for a periodically excited vapor electric device having a main anode and cathode comprising an electrode in said device, a source of alternating potential, circuit means including an impedance connected in series circuit relation with said source and said electrode impressing the potential of said source between said electrode and the cathode of said valve and a direct current voltmeter connected across said circuit means, said voltmeter being calibrated to indicate delay angle in said device.

FRANCIS E. MARSH.
CHARLES R. MARCUM.

No references cited.